(12) United States Patent
Cully et al.

(10) Patent No.: US 11,684,077 B2
(45) Date of Patent: Jun. 27, 2023

(54) METHODS AND DEVICES FOR HEATING OR COOLING VISCOUS MATERIALS

(71) Applicant: Société des Produits Nestlé S.A., Vevey (CH)

(72) Inventors: Kevin J Cully, Chesterfield, MO (US); Andrew Joseph Brinkmann, Manchester, MO (US); Ronald Lee Nash, Florissant, MO (US); William D Short, Litchfield, IL (US); Trent C Lorraine, Amazonia, MO (US); Jerry J Hankins, St. Joseph, MO (US)

(73) Assignee: SOCIÉTÉ DES PRODUITS NESTLÉ S.A., Vevey (CH)

( * ) Notice: Subject to any disclaimer, the term of this patent is extended or adjusted under 35 U.S.C. 154(b) by 0 days.

(21) Appl. No.: 17/330,564

(22) Filed: May 26, 2021

(65) Prior Publication Data
US 2021/0274819 A1 Sep. 9, 2021

Related U.S. Application Data

(60) Continuation of application No. 15/710,075, filed on Sep. 20, 2017, now Pat. No. 11,064,720, which is a
(Continued)

(51) Int. Cl.
*A23L 13/60* (2016.01)
*F28D 9/00* (2006.01)
(Continued)

(52) U.S. Cl.
CPC .............. *A23L 13/67* (2016.08); *A22C 7/00* (2013.01); *A22C 11/00* (2013.01); *A23B 4/005* (2013.01);
(Continued)

(58) Field of Classification Search
CPC ..... F28D 2021/0042; F28D 2021/0098; F28D 9/0093; F28F 2240/00
See application file for complete search history.

(56) References Cited

U.S. PATENT DOCUMENTS 213,635 A * 3/1879 Drache ................. F28D 9/0062
165/DIG. 387
482,246 A 9/1892 Seither
(Continued)

FOREIGN PATENT DOCUMENTS

DE 102008058210 5/2010
EP 0685699 12/1995
(Continued)

OTHER PUBLICATIONS

International Search Report and Written Opinion to PCT/US12/44889 dated Feb. 1, 2013.
(Continued)

*Primary Examiner* — Paul Alvare

(57) ABSTRACT

Methods and devices heat or cool viscous materials, such as meat emulsions useful for producing food and other products. The devices have a heat exchanger including a first plate, a second plate attached to the first plate, and a first spacer and a second spacer arranged between the first plate and the second plate. The first plate, the second plate, the first spacer, and the second spacer define at least one temperature controlled passage for a product to pass through the heat exchanger.

17 Claims, 8 Drawing Sheets

Related U.S. Application Data division of application No. 14/234,891, filed as application No. PCT/US2012/044889 on Jun. 29, 2012, now Pat. No. 9,803,932.

(51) Int. Cl.

| | |
|---|---|
| *F28F 9/02* | (2006.01) |
| *F28F 3/08* | (2006.01) |
| *F28D 21/00* | (2006.01) |
| *A23L 13/50* | (2016.01) |
| *A23L 17/00* | (2016.01) |
| *A22C 7/00* | (2006.01) |
| *A22C 11/00* | (2006.01) |
| *A23B 4/005* | (2006.01) |
| *A23B 4/06* | (2006.01) |
| *A23K 50/40* | (2016.01) |

(52) U.S. Cl.
CPC ............... *A23B 4/06* (2013.01); *A23K 50/40* (2016.05); *A23L 13/52* (2016.08); *A23L 13/60* (2016.08); *A23L 17/70* (2016.08); *F28D 9/0031* (2013.01); *F28D 9/0062* (2013.01); *F28D 9/0081* (2013.01); *F28D 9/0093* (2013.01); *F28F 9/026* (2013.01); *F28D 2021/0042* (2013.01); *F28D 2021/0098* (2013.01); *F28F 3/083* (2013.01); *F28F 2240/00* (2013.01); *F28F 2275/205* (2013.01)

(56) References Cited

U.S. PATENT DOCUMENTS

| | | | |
|---|---|---|---|
| 2,039,216 | A | 4/1936 | Harvey |
| 2,101,782 | A | 12/1937 | Kuhner |
| 2,229,306 | A | 1/1941 | Prestage |
| 2,811,336 | A | 10/1957 | William |
| 2,860,991 | A | 11/1958 | Christianson |
| 3,176,763 | A | 4/1965 | Frohlich |
| 3,235,388 | A | 2/1966 | Ray |
| 3,310,105 | A | 3/1967 | Butt |
| 3,346,394 | A | 10/1967 | Rongey |
| 3,889,013 | A | 6/1975 | Moule |
| 4,139,054 | A | 2/1979 | Anderson |
| 4,150,719 | A | 4/1979 | Thielen |
| 4,207,281 | A | 6/1980 | Bernard |
| 4,249,595 | A | 2/1981 | Butt |
| 4,271,682 | A | 6/1981 | Seki |
| 4,303,008 | A | 12/1981 | Hice |
| 4,497,689 | A | 2/1985 | Szucs |
| 4,614,489 | A | 9/1986 | Juravic |
| 4,681,155 | A | 7/1987 | Kredo |
| 5,056,590 | A | 10/1991 | Bohn |
| 5,431,936 | A | 7/1995 | Leger |
| 5,471,913 | A | 12/1995 | Margittai |
| 5,558,155 | A | 9/1996 | Ito |
| 5,643,618 | A | 7/1997 | Huberg |
| 5,820,911 | A | 10/1998 | Morse |
| 5,823,251 | A | 10/1998 | Romero |
| 6,131,648 | A | 10/2000 | Rasmussen |
| 6,516,874 | B2 | 2/2003 | Mathur |
| 6,892,803 | B2 | 5/2005 | Memory |
| 7,275,927 | B2 | 10/2007 | Howsam |
| 7,506,683 | B2 | 3/2009 | Hu |
| 7,736,686 | B2 | 6/2010 | Dingman |
| 8,196,644 | B1 | 6/2012 | Niske |
| 8,567,487 | B2 | 10/2013 | Christensen |
| 9,232,814 | B2 | 1/2016 | Cully |
| 2001/0005516 | A1 | 6/2001 | Yoshii |
| 2004/0072013 | A1 | 4/2004 | Tada |
| 2005/0084578 | A1 | 4/2005 | Onwulata |
| 2005/0155749 | A1 | 7/2005 | Memory et al. |
| 2006/0219394 | A1 | 10/2006 | Martin |
| 2007/0148323 | A1 | 6/2007 | Dingman |
| 2009/0068336 | A1 | 3/2009 | Torney |
| 2009/0087355 | A1 | 4/2009 | Ashe |
| 2009/0120629 | A1 | 5/2009 | Ashe |
| 2009/0139703 | A1 | 6/2009 | Vet |
| 2009/0194267 | A1 | 8/2009 | Gustafsson |
| 2009/0211977 | A1 | 8/2009 | Miller |
| 2010/0025023 | A1 | 2/2010 | Schmidt et al. |
| 2010/0078155 | A1 | 4/2010 | Morra |
| 2011/0017439 | A1 | 1/2011 | Carloff |
| 2011/0023727 | A1 | 2/2011 | Deane |
| 2012/0090822 | A1 | 4/2012 | Francois |
| 2012/0276266 | A1 | 11/2012 | Tacke |
| 2013/0047661 | A1 | 2/2013 | Janssens |
| 2014/0178544 | A1 | 6/2014 | Cully |
| 2014/0332183 | A1 | 11/2014 | Choi |
| 2015/0075759 | A1 | 3/2015 | McCandlish |
| 2015/0140190 | A1 | 5/2015 | Cully |
| 2017/0219148 | A1 | 8/2017 | Ozono |

FOREIGN PATENT DOCUMENTS

| | | | |
|---|---|---|---|
| FR | 2950682 | | 4/2011 |
| GB | 2068256 A | * | 8/1981 ............ B01J 16/005 |
| JP | 2004-532652 | | 10/2004 |
| JP | 200717133 | | 1/2007 |
| WO | 8303663 | | 10/1983 |
| WO | 200007929 | | 2/2000 |
| WO | 200250487 | | 6/2002 |
| WO | 2004083761 | | 4/2004 |
| WO | 2006120026 | | 11/2006 |
| WO | 2006120028 | | 11/2006 |

OTHER PUBLICATIONS

European extended Search report for Application No. 12817291.3 dated Nov. 21, 2014.

European extended Search report for Application No. 15189154.6 dated May 2, 2016.

Oxford Dictionary definition of "clamp", taken from https://en.oxforddictionaries.com/definition/clamp. Jan. 17, 2019.

* cited by examiner

METHODS AND DEVICES FOR HEATING OR COOLING VISCOUS MATERIALS

CROSS REFERENCE TO RELATED APPLICATIONS

This application is a continuation of U.S. application Ser. No. 15/710,075 filed Sep. 20, 2017 which is a divisional of U.S. application Ser. No. 14/234,891 filed Apr. 23, 2014, which is a National Stage Entry of PCT/US12/44889 filed Jun. 29, 2012, which claims priority to U.S. Provisional Application Ser. No. 61/574,152 filed Jul. 28, 2011, the disclosures of which are incorporated herein by this reference.

BACKGROUND OF THE INVENTION

Field of the Invention

The invention relates generally to methods and devices for heating or cooling viscous materials and particularly to methods and devices for producing food products from meat emulsions.

Description of Related Art

Methods for producing meat emulsions and foods from such emulsions using conventional concentric tube heat exchangers are known in the food industry. Meat emulsions are widely used in the production of products such as bolognas, frankfurters, sausages, animal foods, and the like. To reduce the cost of certain food products to consumers, there has been a demand, in recent years, for meat emulsion products that resemble chunks or pieces of natural meat in appearance, texture, and physical structure, i.e., meat analogs. Such products are used as a partial or complete replacement for more expensive natural meat chunks in food products such as stews, pot pies, casseroles, canned foods, and pet food products.

Conventional concentric tube type heat exchangers, used to cool or heat vicious and/or fibrous materials, have designs that partially obstruct the flow of product through the heat exchanger. This obstruction may change the property of the materials, cause equipment clogging and reduce output. Previous solutions have involved using long tubes and/or modifying the design of tube type. Such modifications have included multiple concentric tubes that increase surface contact, typically to ensure cooling/heating on both sides of the product. Nevertheless, increasing tube length and/or diameter of a concentric tube heat exchanger increases the complexity of the design while reducing process flexibility.

Conventional plate heat exchangers have similar issues as the concentric tube heat exchanger in that the product must flow through a tortuous path causing obstructions in the material product as it moves from plate to plate. Moreover, existing heat exchanger designs have limitations regarding pressure rating, uniform product flow, expandability and flexibility.

SUMMARY OF THE INVENTION

The invention generally relates to devices such as heat exchangers for making meat emulsion products and methods of using the devices. In an embodiment, the invention provides a device comprising a first plate, a second plate attached to the first plate, and a first spacer and a second spacer arranged between the first plate and the second plate. The first plate, the second plate, the first spacer and the second spacer define at least one passage for a product to pass through the device. The device further includes a third plate attached to the second plate, and a third spacer and a fourth spacer arranged between the second plate and the third plate. The second plate, the third plate, the third spacer and the fourth spacer define another passage for a second product to pass through the device.

The first plate, the second plate and/or the third plate comprise energy exchanging capabilities. For example, the first plate, the second plate and/or the third plate can be constructed and arranged to heat or cool (e.g., via conduction or convection) the product in the passages.

In an embodiment, the first plate, the second plate and/or the third plate define a temperature controlled zone. For example, the first plate, the second plate and/or the third plate comprise a passage through a portion of the first plate, the second plate and/or the third plate. The passage can comprise any suitable fluid that cools or heats the plates of the temperature controlled zone of the device.

In an embodiment, the first plate and the second plate and the second plate and the third plate define a plurality of temperature controlled zones. For example, the first plate, the second plate and/or the third plate comprises a plurality of separate passages through individual portions of the first plate, the second plate and/or the third plate. The passages can comprise a fluid that cools or heats the plates of the temperature controlled zones of the device.

In an embodiment, the passage between the first plate and the second plate comprises a gap and the passage between the second plate and third plate comprises a gap. The first spacer, the second spacer, the third spacer and the fourth spacer can be oval-shaped.

The first plate and the second plate can be sealed along the first spacer and the second spacer to withstand internal pressures in the passage from about 50 to about 1500 psi. The first plate and the second plate can be attached together by any suitable means such as, for example, one or more screws.

The second plate and the third plate can be sealed along the third spacer and the fourth spacer to withstand internal pressures in the passage from about 50 to about 1500 psi. The second plate and the third plate can be attached together by any suitable means such as, for example, one or more screws.

In an embodiment, the device comprises an inlet manifold attached to an end of the device. The inlet manifold can define an inlet passage for the product that divides into a first outlet passage and a second outlet passage. The first outlet passage leads into the first passage of the device and the second outlet passage leads into the second passage of the device.

In another embodiment, the invention provides a heat exchanger comprising a first pressure plate and a first energy exchanging plate attached to the first pressure plate. A second energy exchanging plate and a third energy exchanging plate are attached to a second pressure plate on opposing sides of a second pressure plate. The second pressure plate is attached to the first pressure plate. A first spacer and a second spacer are arranged between the first energy exchanging plate and the second energy exchanging plate. The first energy exchanging plate, the second energy exchanging plate, the first spacer and the second spacer define a first temperature controlled passage for a first product to pass through the heat exchanger. The heat exchanger further comprises a third pressure plate and a fourth energy exchanging plate attached to the third pressure plate. The third pressure plate is attached to the second pressure plate. A third spacer and a fourth spacer are arranged between the third energy exchanging plate and the fourth energy exchanging plate. The third energy exchanging plate, the fourth energy exchanging plate, the third spacer and the fourth spacer define a second temperature controlled passage for a second product to pass through the heat exchanger.

In an embodiment, the first energy exchanging plate and/or the second energy exchanging plate comprises a passage through a portion of the first energy exchanging plate and/or the second energy exchanging plate. The third energy exchanging plate and/or the fourth energy exchanging plate can also comprise a passage through a portion of the third energy exchanging plate and/or the fourth energy exchanging plate. The passage can comprise any suitable fluid that cools or heats (e.g., by conduction or convection) the energy exchanging plates of the temperature controlled zone of the heat exchanger.

In an embodiment, the first energy exchanging plate and the second energy exchanging plate define a plurality of temperature controlled zones. The third energy exchanging plate and the fourth energy exchanging plate can also define a plurality of temperature controlled zones. For example, the first energy exchanging plate, the second energy exchanging plate, the third energy exchanging plate and/or the fourth energy exchanging plate comprise a plurality of separate passages through individual portions of the respective energy exchanging plate(s) that define the temperature controlled zones. The passages can comprise a fluid that cools or heats the energy exchanging plates of the temperature controlled zones of the heat exchanger.

The first spacer, the second spacer, the third spacer and the fourth spacer can be oval-shaped. The first energy exchanging plate and the second energy exchanging plate can be sealed along the first spacer and the second spacer to withstand internal pressures in the product passage from about 50 to about 1500 psi. The third energy exchanging plate and the fourth energy exchanging plate can be sealed along the third spacer and the fourth spacer to withstand internal pressures in the product passage from about 50 to about 1500 psi.

In an embodiment, the heat exchanger further comprises a first end plate defining an inlet and a second end plate defining an outlet. The first end plate and the second end plate are attached to opposite ends of the first pressure plate and the second pressure plate. The heat exchanger can also comprise one or more transitioning gaskets attached to the inlet of the heat exchanger that transition from the opening of the inlet to the passage formed by the plates. The first pressure plate and the second pressure plate can be attached together by any suitable means such as, for example, one or more screws, bolts or clamps.

In another embodiment, the invention provides a heat exchanger comprising a first pressure plate and a first energy exchanging plate attached to the first pressure plate. A first spacer and a second spacer are arranged between the first energy exchanging plate and a second energy exchanging plate. The first energy exchanging plate, the second energy exchanging plate, the first spacer and the second spacer define a first temperature controlled passage for a first product to pass through the heat exchanger. A third energy exchanging plate is attached to the second energy exchanging plate. The heat exchanger further comprises a second pressure plate, and a fourth energy exchanging plate is attached to the second pressure plate. The second pressure plate is attached to the first pressure plate. A third spacer and a fourth spacer are arranged between the third energy exchanging plate and the fourth energy exchanging plate. The third energy exchanging plate, the fourth energy exchanging plate, the third spacer and the fourth spacer define a second temperature controlled passage for a second product to pass through the heat exchanger.

In an alternative embodiment, the invention provides a heat exchanger comprising a first pressure plate and a first energy exchanging plate attached to the first pressure plate. A first spacer and a second spacer are arranged between the first energy exchanging plate and a second energy exchanging plate. The first energy exchanging plate, the second energy exchanging plate, the first spacer and the second spacer define a first temperature controlled passage for a first product to pass through the heat exchanger. The heat exchanger further comprises a second pressure plate, and a third energy exchanging plate is attached to the second pressure plate. The second pressure plate is attached to the first pressure plate. A third spacer and a fourth spacer are arranged between the second energy exchanging plate and the third energy exchanging plate. The second energy exchanging plate, the third energy exchanging plate, the third spacer and the fourth spacer define a second temperature controlled passage for a second product to pass through the heat exchanger.

In another embodiment, the invention provides a method for making a food product. The method comprises introducing a food product into a heat exchanger and subjecting the product to a high pressure. The heat exchanger comprises a first plate, a second plate attached to the first plate and separated by a first spacer and a second spacer arranged between the first plate and the second plate, and a third plate attached to the second plate and separated by a third spacer and a fourth spacer arranged between the second plate and the third plate. The first plate, the second plate, the first spacer and the second spacer define a first temperature controlled passage for the meat emulsion to pass through the heat exchanger. The second plate, the third plate, the third spacer and the fourth spacer define a second temperature controlled passage for the meat emulsion to pass through the heat exchanger.

In an embodiment, the method comprises controlling a temperature of the heat exchanger by passing a fluid through at least one passage of a portion of at least one of the energy exchanging plates. For example, the energy exchanging plates can define a plurality of individual temperature controlled zones. The temperatures of individual temperature controlled zones can be controlled by passing a fluid through a plurality of separate passages through individual portions of the energy exchanging plates.

In yet another embodiment, the invention provides a method for making a meat emulsion product. The method comprises forming a meat emulsion containing protein and fat, comminuting and heating the meat emulsion, introducing the meat emulsion into a heat exchanger and subjecting the meat emulsion to a pressure of at least 70 psi. The heat exchanger comprises a first plate, a second plate attached to the first plate and separated by a first spacer and a second spacer arranged between the first plate and the second plate, and a third plate attached to the second plate and separated by a third spacer and a fourth spacer arranged between the second plate and the third plate. The first plate, the second plate, the first spacer and the second spacer define a first temperature controlled passage for the meat emulsion to pass through the heat exchanger. The second plate, the third plate, the third spacer and the fourth spacer define a second temperature controlled passage for the meat emulsion to pass through the heat exchanger. The heat emulsion is then discharged from the heat exchanger.

In an embodiment, the method further comprises retorting the discharged meat emulsion product. In another embodiment, the method can further comprise drying or frying the discharged meat emulsion and forming a kibble-like piece from the meat emulsion.

An advantage of the invention is to provide an improved heat exchanger.

Another advantage of the invention is to provide a heat exchanger having increased production rates with little or no increase in the amount of equipment floor space required.

Still another advantage of the invention is to provide a heat exchanger having lower operating pressures with little or no increase in the equipment floor space required.

Yet another advantage of the invention is to provide an improved device for making a meat emulsion product.

Another advantage of the invention is to provide an improved method of making a meat emulsion product.

Additional features and advantages are described herein, and will be apparent from, the following Detailed Description and the figures.

DETAILED DESCRIPTION OF THE INVENTION

The invention provides methods and devices suitable for heating or cooling viscous materials. In one embodiment, the methods and devices are suitable for producing food products from meat emulsions. More specifically, in an embodiment, the invention provides a high pressure plate heat exchanger useful for making meat emulsion products. For example, the high pressure plate heat exchanger comprises multiple sets of heating/cooling plates stacked on top of each other with a uniquely designed inlet manifold that uniformly channels material to each set of plates. The heat exchanger permits the use of higher pressures and an increased product throughput. In addition, the heat exchanger can be designed to minimize or avoid obstructing the product as it passes through, which eliminates or reduces clogging within the heat exchanger.

Figure 1:
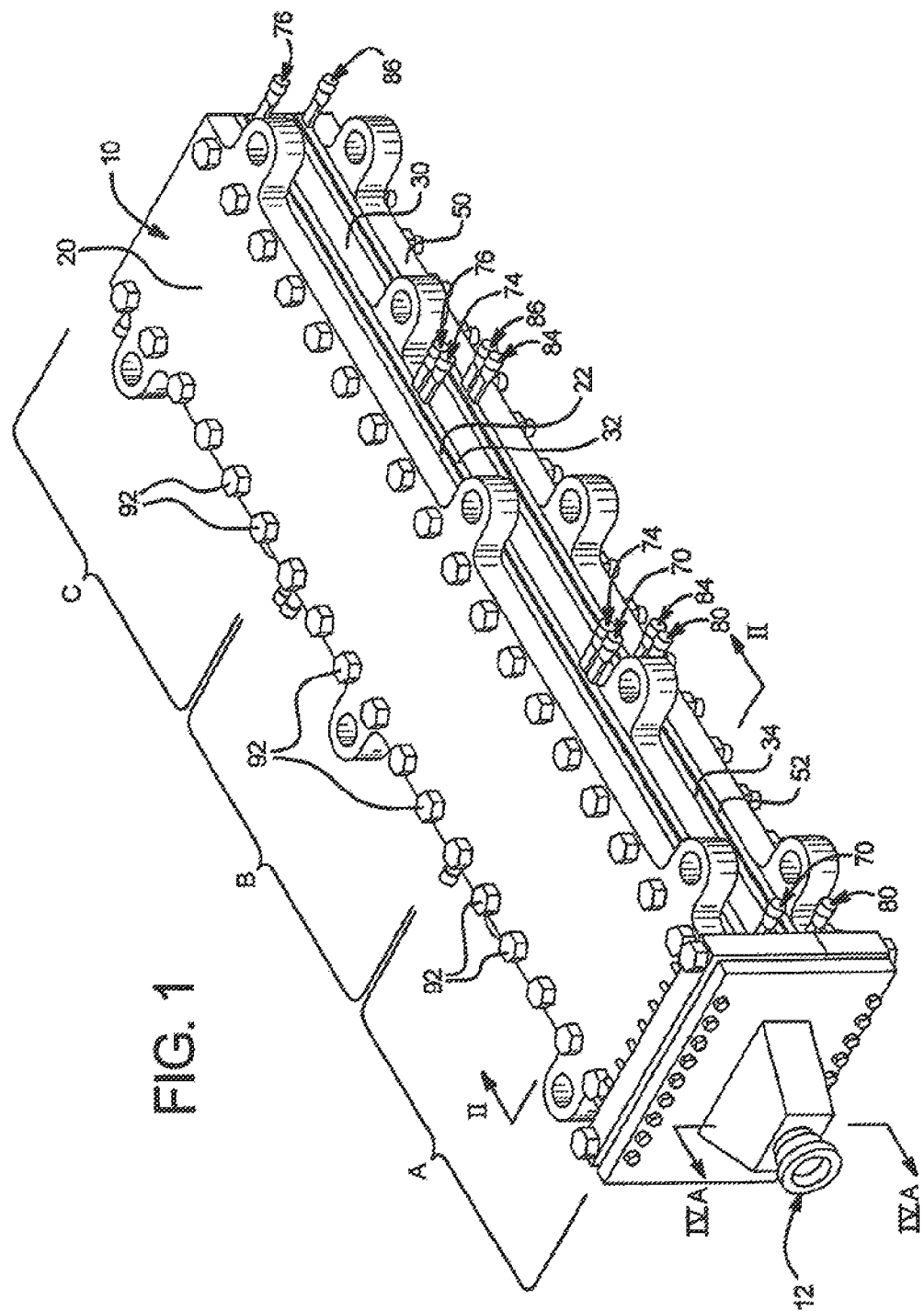
FIG. 1 illustrates a perspective view of the heat exchanger and inlet manifold in an embodiment of the invention.
Figure 2:
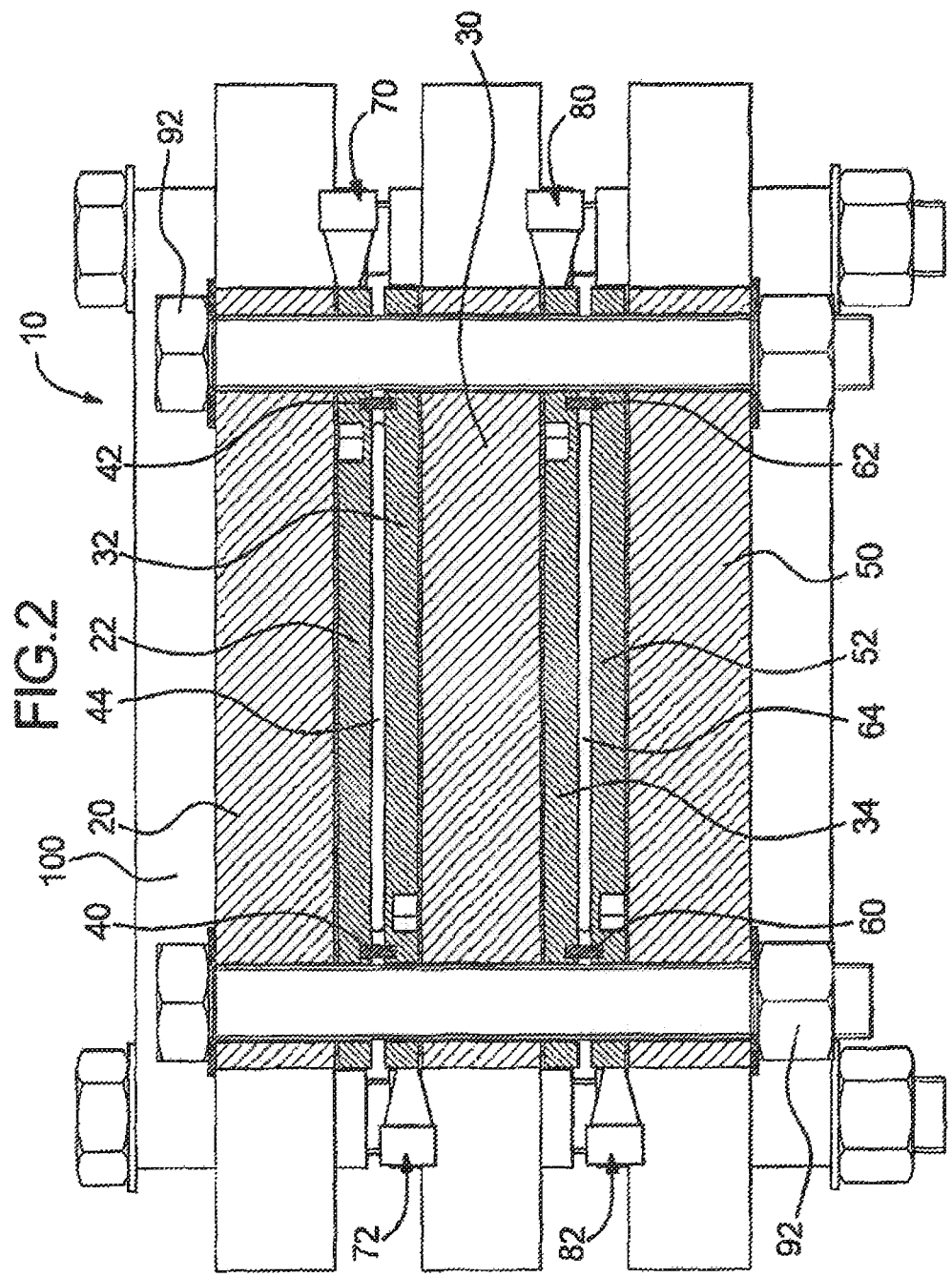
FIG. 2 illustrates a cross-section view II of the heat exchanger in FIG. 1.
Figure 3:
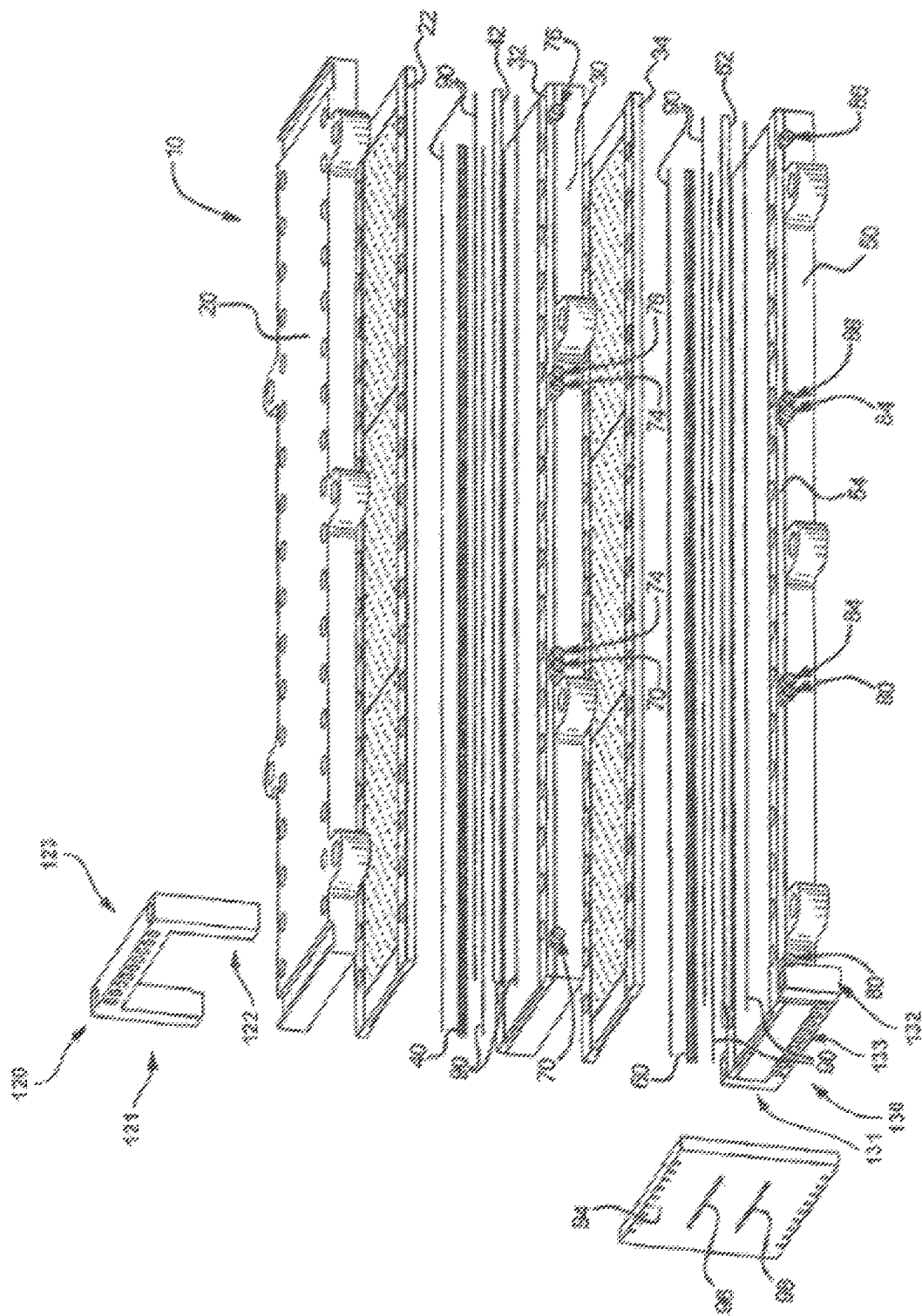
FIG. 3 illustrates an exploded view of the heat exchanger in FIG. 1.

In a general embodiment illustrated in FIGS. 1-3, the invention provides a heat exchanger 10 and an inlet manifold 12 attached to the heat exchanger 10. The heat exchanger 10 comprises a first pressure plate 20 and a first energy exchanging plate 22 attached to the first pressure plate 20, a second pressure plate 30 and a second energy exchanging plate 32 attached to the second pressure plate 30. The second pressure plate 30 is attached to the first pressure plate 20. The heat exchanger 10 further comprises a first spacer 40 and a second spacer 42 arranged between the first energy exchanging plate 20 and the second energy exchanging plate 30. The first energy exchanging plate 22, the second energy exchanging plate 32, the first spacer 40 and the second spacer 42 define a temperature controlled passage 44 for a first product to pass through the heat exchanger 10. A third energy exchanging plate 34 is attached to the second pressure plate 30 on an opposing side of the second pressure plate 30 from the second energy exchanging plate 32.

The heat exchanger 10 further comprises a third pressure plate 50 and a fourth energy exchanging plate 52 attached to the third pressure plate 50. The third pressure plate 50 is attached to the second pressure plate 30. A third spacer 60 and a fourth spacer 62 are arranged between the third energy exchanging plate 34 and the fourth energy exchanging plate 52. The third energy exchanging plate 34, the fourth energy exchanging plate 52, the third spacer 60 and the fourth spacer 62 define a second temperature controlled passage 64 for a second product to pass through the heat exchanger 10. This second temperature controlled passage 64 increases the amount of product that can pass through the heat exchanger 10 than a typical heat exchanger with a single passage.

The pressure plates 20, 30 and 50, the energy exchanging plates 22, 32, 34 and 52 and the spacers 40, 42, 60 and 62 can be made out of any suitable material sufficient for their intended purposes. For example, the pressure plates 20, 30 and 50 can comprise steel or other material capably to withstand the stresses related to elevated pressures and/or temperatures. The energy exchanging plates 22, 32, 34 and 52 can comprise steel or other material capably to withstand the stresses related to elevated pressures and/or temperatures. The spacers 40, 42, 60 and 62 can comprise steel, a polymer or other material capably to withstand the stresses related to elevated pressures and/or temperatures.

In an embodiment, the first energy exchanging plate 22 and/or the second energy exchanging plate 32 comprise one or more passages 70 and 72, respectively, through any portion of the first energy exchanging plate 22 and/or the second energy exchanging plate 32. In another embodiment, the third energy exchanging plate 34 and/or the fourth energy exchanging plate 52 comprise one or more passages 80 and 82, respectively, through any portion of the third energy exchanging plate 34 and/or the fourth energy exchanging plate 52. For example, the passages 70, 72, 80 and 82 can be constructed and arranged to pass through as much or as little of the energy exchanging plates as desired to affect temperature change of the plates. The passages 70, 72, 80 and 82 can also comprise an inlet and an outlet for a heating/cooling fluid to pass through thereby facilitating heating or cooling of the product that is moving through the passages 44 and 64 of the heat exchanger 10.

Any suitable fluid (e.g., water) or gas at any desired temperature that cools or heats the energy exchanging plates 22, 32, 34 and 52 of the temperature controlled zone of the heat exchanger 10 can be used. By individually controlling the temperature of the first energy exchanging plate 22, the second energy exchanging plate 32, the third energy exchanging plate 34 and/or the fourth energy exchanging plate 52, the heat exchanger can cool or heat the product on one or both sides thereby increasing the efficiency of the heat or cooling exchange. Alternatively or in addition to, the first energy exchanging plate 22, the second energy exchanging plate 32, the third energy exchanging plate 34 and/or the fourth energy exchanging plate 52 can utilize any other suitable heating or cooling mechanisms know to the skilled artisan.

As illustrated in FIG. 1, the first energy exchanging plate 22, the second energy exchanging plate 32, the third energy exchanging plate 34 and the fourth energy exchanging plate 52 can also define a plurality of sequential temperature controlled zones A-C. For example, the first energy exchanging plate 22 and/or the second energy exchanging plate 32 comprises a plurality of separate passages 70, 74 and 76 through individual portions of the first energy exchanging plate and/or the second energy exchanging plate that define each of the temperature controlled zones A-C. Similarly, the third energy exchanging plate 34 and/or the fourth energy exchanging plate 52 comprises a plurality of separate passages 80, 84 and 86 through individual portions of the third energy exchanging plate and/or the fourth energy exchanging plate that define each of the temperature controlled zones A-C.

The passages 70, 74 and 76 and 80, 84 and 86 can each comprise the same or different fluids or gases that cool or heat the individual temperature controlled zones A-C of the heat exchanger 10. The cooling/heating zones can be configured so that the material being cooled or heated is not obstructed once it enters the cooling or heating zone.

Each of the temperature controlled zones A-C can be kept at a specific temperature, for example, by controlling the temperature and flowrate of the individual fluid or gas through the passages 70, 74 and 76 and 80, 84 and 86. In this manner, each of the temperature controlled zones A-C can be at the same or different temperature. The temperature zones can be designed to increase or decrease in temperature as the product is passed through the heat exchanger. For example, during cooling of the meat emulsion, the temperatures zones can be set to cool the food in succession from one zone to another through the heat exchanger. Although three temperature controlled zones are illustrated, it should be appreciated that the heat exchanger 10 can comprise any suitable number of temperature controlled zones in alternative embodiments of the invention. Moreover, two or more heat exchangers of the invention can be placed sequentially to offer additional heating or cooling zones as necessary.

As shown in FIG. 2, the passage 44 comprises a gap between the first energy exchanging plate 22 and the second energy exchanging plate 32. The passage 64 comprises a gap between the third energy exchanging plate 34 and the fourth energy exchanging plate 52. The gaps can comprise any suitable height. As further shown in FIG. 2, in an embodiment, the spacers 40, 42, 60 and 62 can be oval-shaped. It should be appreciated the spacers can be any suitable shape, for example, to provide a passage between their respective energy exchanging plates. The distance between the energy exchanging plates 22 and 32 or 34 and 52 and therefore the size of the cooling/heating zones can be adjustable by modifying the size of the spacers 40, 42, 60 and 62.

The first energy exchanging plate 22 and the second energy exchanging plate 32 can be sealed in any suitable manner along the first spacer 40 and the second spacer 42 to withstand pressures required to process the product as it passes through the device, e.g., from about 50 to about 1500 psi. Similarly, the third energy exchanging plate 34 and the fourth energy exchanging plate 52 can be sealed in any suitable manner along the third spacer 60 and the fourth spacer 62 to withstand pressures required to process the product as it passes through the device, e.g., from about 50 to about 1500 psi. This prevents the products in the passages from permeating the energy exchanger (e.g., from high internal pressures) as they pass through. For example, as shown in FIG. 3, in an embodiment, one or more long gaskets 90 can be placed along the spacers 40, 42, 60 and 62 to provide additional seals. Preferably, the heat exchanger can be sealed to withstand positive pressures from about 50 to about 1500 psi and handle products with high viscosities e.g., 100,000 centipoises.

As illustrated in FIG. 3, in an embodiment, the heat exchanger 10 further comprises a first end plate 94 defining a first inlet 96 and a second inlet 98. It should be appreciated that a second end plate (not shown) can be attached to an opposite end of the first heat exchanger 10 to be used as an outlet plate. The first end plate 94 can also be used to attach two or more heat exchangers 10 together in a sequential fashion as discussed previously. For example, two or more heat exchangers can be brought together by attaching a first end plate of one heat exchanger to the second end plate of another heat exchanger.

In some embodiments, the heat exchanger is designed to be connected in series and/or parallel with other copies of the heat exchanger. However, due to the capability of expanding the heat exchanger by "stacking" heat transfer plates on top of each other (increasing heat transfer area), the need to place the heat exchangers in series and/or parallel can be diminished.

The inlet end of the heat exchanger 10 can also comprise one or more transitioning gaskets (not shown) attached to the inlet plate 94 of the heat exchanger 10 that transition from the opening of the inlet to the passages formed by the energy exchanging plates 22, 32, 34 and 52. The transiting gaskets can provide, for example, a generally smooth transition (e.g., by decreasing in size of the opening) as the product enters the heat exchanger's temperature controlled zones from a previous device or pipeline. Likewise, the heat exchanger 10 can also comprise one or more transitioning gaskets (not shown) attached to an outlet plate (not shown) of the heat exchanger 10 that transition from the passages formed by the energy exchanging plates 22, 32, 34 and 52 to the opening of the outlet plate.

The first pressure plate 20, the second pressure plate 30 and the third pressure plate 50 can be attached and held together by any suitable means and at any suitable location. For example, first pressure plate 20, the second pressure plate 30 and the third pressure plate 50 can be held together by one or more bolts, screws and/or clamps 92 that pass through portions of the plates as illustrated in FIGS. 1-2.

Figure 4A:
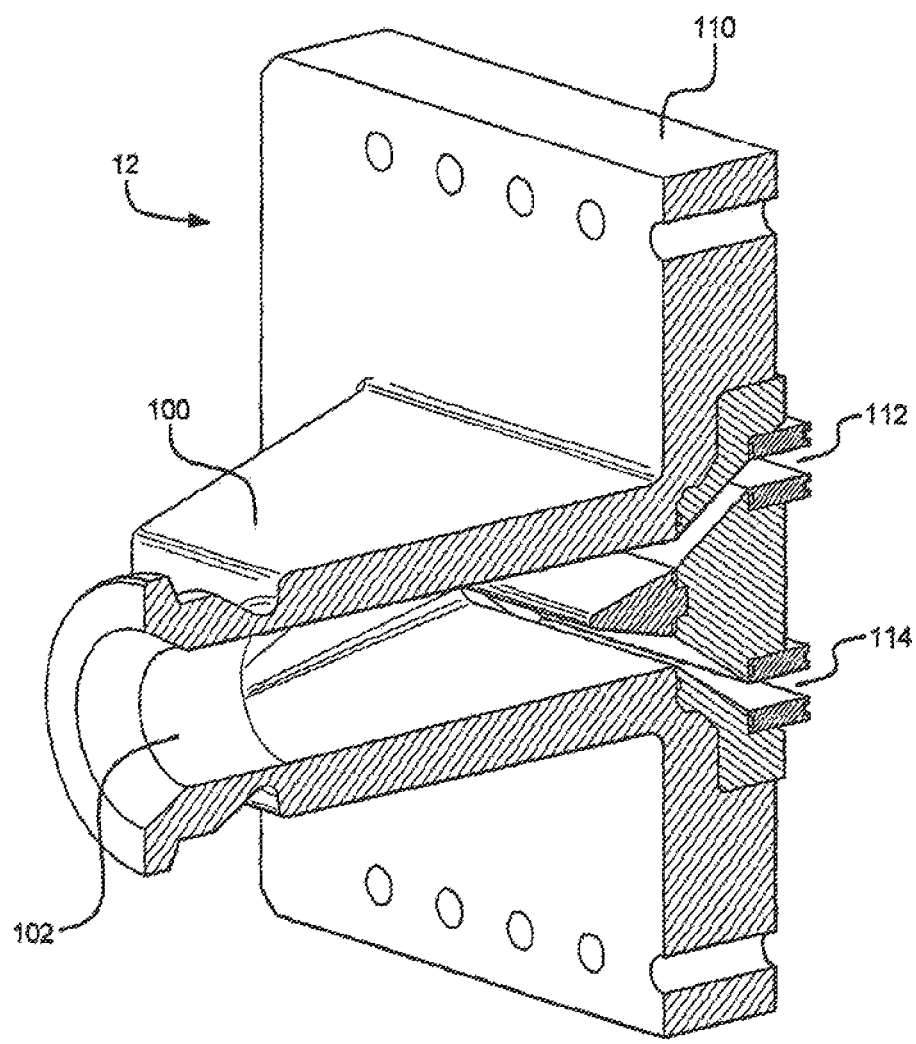
FIG. 4A illustrates a cross-section view WA of the inlet manifold in FIG. 1.
Figure 4B:
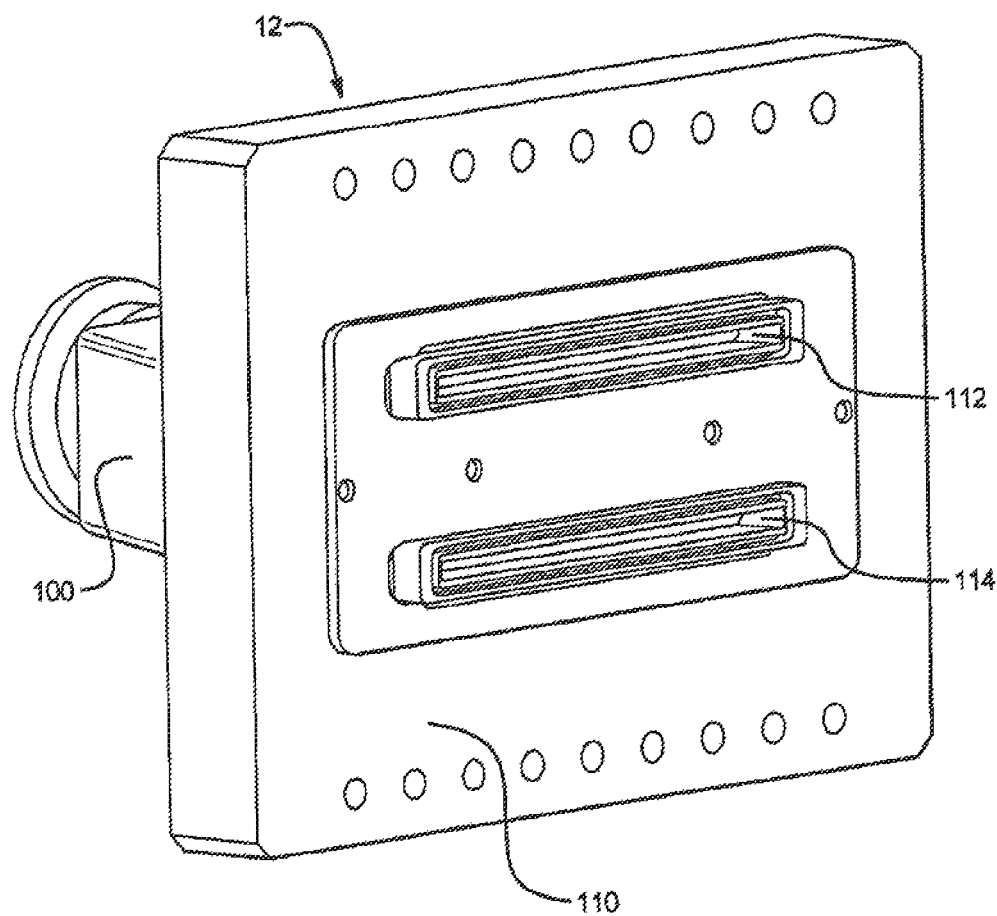
FIG. 4B illustrates a rear perspective view of the inlet manifold in FIG. 1.

As illustrated in FIGS. 1 and 4A-4B, in one embodiment, the inlet manifold 12 comprises a front portion 100 defining an inlet passage 102 and a rear portion 110 that defines two outlet passages 112 and 114. The inlet manifold 12 is constructed and arranged so that the inlet passage 102 divides into the two outlet passages 112 and 114 that correspond with the first inlet 96 and a second inlet 98, respectively, of the first end plate 94. As a result, the product or material entering the heat exchanger 10 to be cooled or heated can be uniformly distributed between the passages 44 and 64 via the inlet manifold 12. Accordingly, the inlet manifold 12 is designed to streamline material flow to distribute the material between the set of energy exchanging plates of the heat exchanger 10.

In another embodiment, the inlet manifold can be designed with two or more inlet passages corresponding to the two or more individual outlet passages so that multiple products can be processed in the heat exchanger at the same time. In an alternative embodiment, the inlet manifold can be designed with one inlet passage corresponding to three or more individual outlet passages. The individual outlet passages of the inlet manifold would correspond to the number of passages in the heat exchanger.

It should be appreciated that the outlet end of the heat exchanger 10 can comprise any suitable number and outlet configurations that correspond with the passages 44 and 64 of the heat exchanger 10. The outlet end of the heat exchanger can also be configured to sequentially attach to another heat exchanger. In addition, the outlet end of the heat exchanger 10 can be directly attached to any suitable ancillary/processing equipment to allow for cutting, resizing, additional texturization or shaping of the product or material being processed as it exits the heat exchanger 10.

In an alternative embodiment, the invention provides a device comprising a first plate, a second plate attached to the first plate, and a first spacer and a second spacer arranged between the first plate and the second plate. The first plate, the second plate, the first spacer and the second spacer define a first passage for a first product to pass through the device. A third plate is attached to the second plate. At least one of the first plate, the second plate and the third plate comprises energy exchanging capabilities. A third spacer and a fourth spacer are arranged between the second plate and the third plate. The second plate, the third plate, the third spacer and the fourth spacer define a second passage for a second product to pass through the device. The first plate, the second plate and the third plate can each function as energy exchanging plates and pressure plates.

In this embodiment, the first plate and the second plate define one or more temperature controlled zones. The second plate and the third plate can also define one or more temperature controlled zones. The first plate, the second plate and/or the third plate also comprise energy exchanging capabilities. Accordingly, the first plate, the second plate and/or the third plate can be constructed and arranged to transfer heat or cold (e.g., via conduction or convection) to or from the product in the first or second passages. For example, the first plate, the second plate and/or the third plate comprise a passage through any portion of the first plate, the second plate and/or the third plate that a cooling or heating liquid passes through. Alternatively or in addition to, the first plate, the second plate and/or the third plate can utilize any other suitable heating or cooling mechanisms know to the skilled artisan.

The first plate, the second plate and/or the third plate can also define a plurality of temperature controlled zones utilizing a plurality of separate passages through individual portions of the first plate and/or the second plate. The passages can comprise any suitable fluid or gas that cools or heats the temperature controlled zones of the device.

The passage can comprise any size gap height between the first plate and the second plate. The first spacer and the second spacer can be oval-shaped. The first plate and the second plate can be sealed along the first spacer and the second spacer to withstand internal pressures in the passage from about 50 to about 1500 psi. The first plate and the second plate can be attached together by any suitable means such as, for example, one or more bolts, screws and/or clamps. In an embodiment, the device can comprise a first end plate defining an inlet and a second end plate defining an outlet that are attached to opposite ends of the first plate and the second plate.

Figure 5:
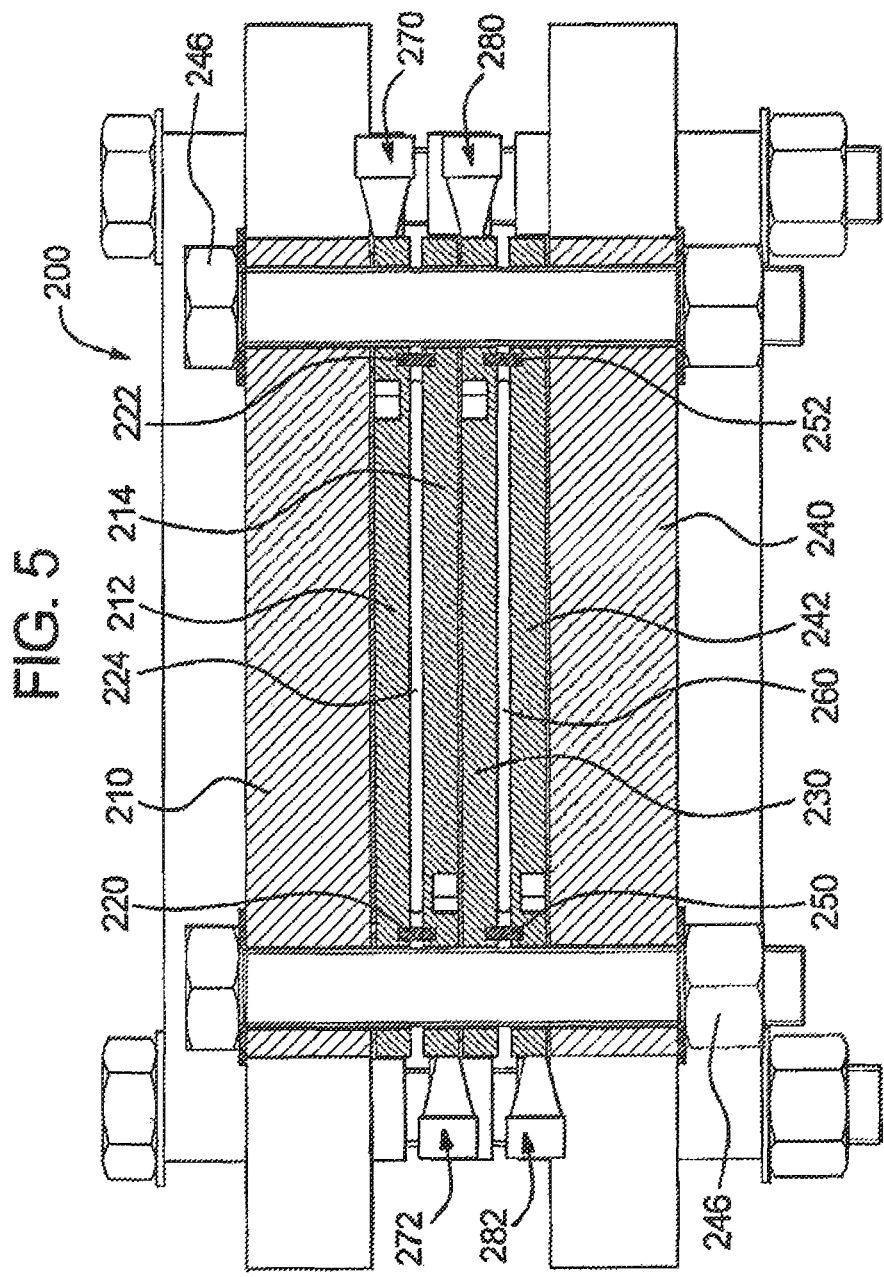
FIG. 5 illustrates a cross-section view of the heat exchanger in another embodiment of the invention.

In another embodiment illustrated in FIG. 5, the invention provides a heat exchanger 200 that does not utilize an intermediate pressure plate. The heat exchanger 200 comprises a first pressure plate 210 and a first energy exchanging plate 212 attached to the first pressure plate 210. The heat exchanger 200 also comprises a second energy exchanging plate 214, and a first spacer 220 and a second spacer 222 are arranged between the first energy exchanging plate 212 and the second energy exchanging plate 214. The first energy exchanging plate 212, the second energy exchanging plate 214, the first spacer 220 and the second spacer 222 define a first temperature controlled passage 224 for a first product to pass through the heat exchanger 200. A third energy exchanging plate 230 is attached to the second energy exchanging plate 214.

The heat exchanger 200 further comprises a second pressure plate 240 and a fourth energy exchanging plate 242 that is attached to the second pressure plate 240. The second pressure plate 240 can be attached to the first pressure plate 210 by one or more bolts, screws and/or clamps 246 that pass through portions of the plates as illustrated in FIG. 5. A third spacer 250 and a fourth spacer 252 are arranged between the third energy exchanging plate 230 and the fourth energy exchanging plate 242. The third energy exchanging plate 230, the fourth energy exchanging plate 242, the third spacer 250 and the fourth spacer 252 define a second temperature controlled passage 260 for a second product to pass through the heat exchanger 200.

The first energy exchanging plate 212 and/or the second energy exchanging plate 214 can comprise one or more passages 270 and 272, respectively, through any portion of the first energy exchanging plate 212 and/or the second energy exchanging plate 214. Similarly, the third energy exchanging plate 230 and/or the fourth energy exchanging plate 242 can comprise one or more passages 280 and 282, respectively, through any portion of the third energy exchanging plate 230 and/or the fourth energy exchanging plate 242. The temperatures of the first and second temperature controlled passages 224 and 260 can be controlled/modified, for example, using fluids/gases through the passages 270, 272, 280 and 282 of the energy exchanging plates in a manner as previously discussed.

Figure 6:
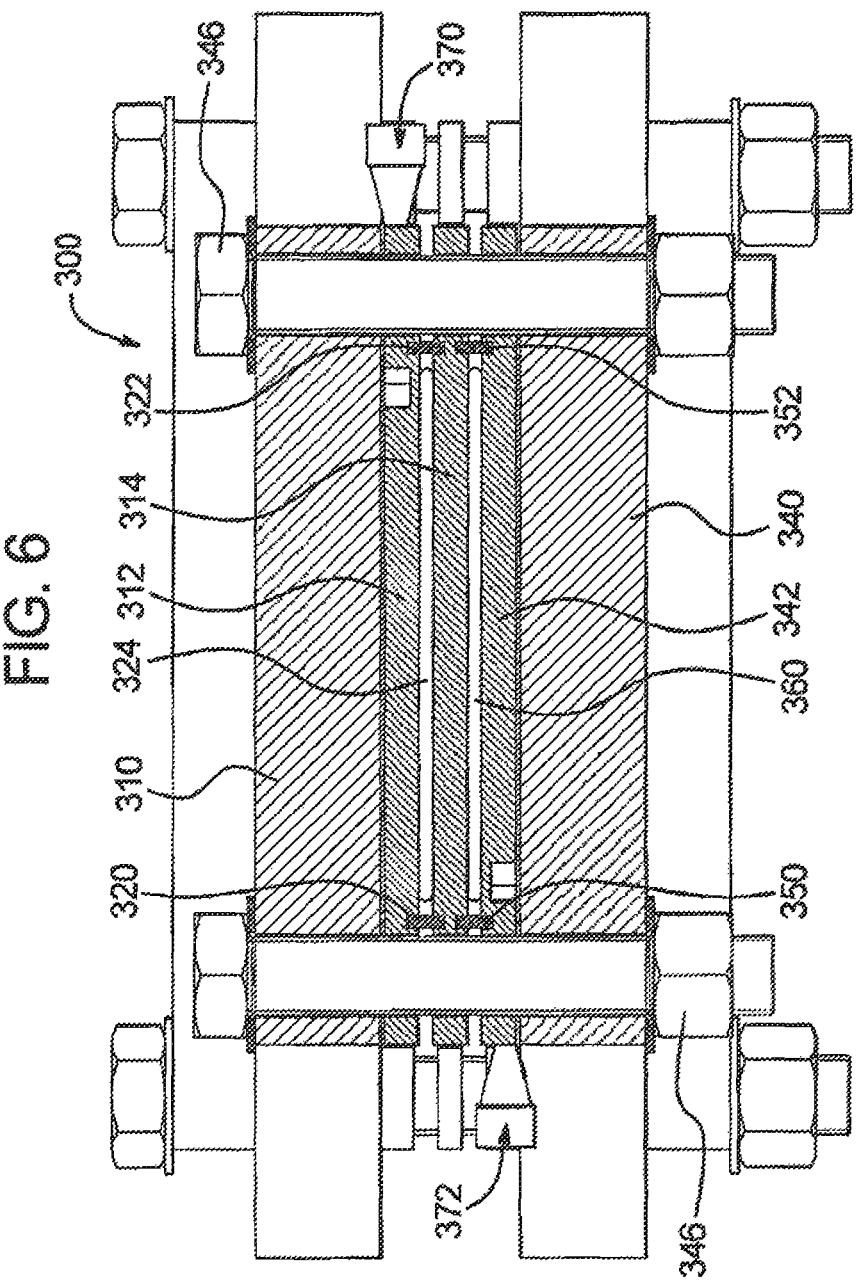
FIG. 6 illustrates a cross-section view of the heat exchanger in another embodiment of the invention.

In an alternative embodiment illustrated in FIG. 6, the invention provides a heat exchanger 300 that shares an intermediate energy exchanging plate. The heat exchanger 300 comprises a first pressure plate 310 and a first energy exchanging plate 312 attached to the first pressure plate 310. The heat exchanger 300 also comprises a second energy exchanging plate 314. A first spacer 320 and a second spacer 322 are arranged between the first energy exchanging plate 312 and the second energy exchanging plate 314. The first energy exchanging plate 312, the second energy exchanging plate 314, the first spacer 320 and the second spacer 322 define a first temperature controlled passage 324 for a first product to pass through the heat exchanger 300.

The heat exchanger 300 further comprises a second pressure plate 340 and a third energy exchanging plate 342 that is attached to the second pressure plate 340. The second pressure plate 340 can be attached to the first pressure plate 310 by one or more bolts, screws and/or clamps 346 that pass through portions of the plates as illustrated in FIG. 6. A third spacer 350 and a fourth spacer 352 are arranged between the second energy exchanging plate 314 and the third energy exchanging plate 342. The second energy exchanging plate 314, the third energy exchanging plate 342, the third spacer 350 and the fourth spacer 352 define a second temperature controlled passage 360 for a second product to pass through the heat exchanger 300.

The first energy exchanging plate 312 and/or the third energy exchanging plate 342 can comprise one or more passages 370 and 372, respectively, through any portion of the first energy exchanging plate 212 and/or the third energy exchanging plate 214. Similarly, the middle or second energy exchanging plate 314 can comprise one or more passages (not shown) the second energy exchanging plate 314. The temperatures of the first and second temperature controlled passages 324 and 360 can be controlled/modified, for example, using fluids/gases through any of the passages of the energy exchanging plates in a manner as previously discussed.

It should be appreciated that the heat exchangers in alternative embodiments of the invention can comprise more than two passages for the product to flow through. In an alternative embodiment, the heat exchangers can be constructed and designed to comprise 3, 4, 5 or more temperature controlled passages in a vertically stacked manner in accordance with the two passage configuration embodiments of the invention. For example, the heat exchanger can comprise additional energy exchanging plates, pressure plates and spacers stacked on each other to provide 3 or more temperature controlled passages in configurations similar to those previously described.

In an alternative embodiment, the invention provides a method for making a food product. The method comprises introducing a meat emulsion into a heat exchanger and subjecting the meat emulsion to pressure. The heat exchanger comprises a first plate, a second plate attached to the first plate and separated by a first spacer and a second spacer arranged between the first plate and the second plate, and a third plate attached to the second plate and separated by a third spacer and a fourth spacer arranged between the second plate and the third plate. The first plate, the second plate, the first spacer and the second spacer define a first temperature controlled passage for the meat emulsion to pass through the heat exchanger. The second plate, the third plate, the third spacer and the fourth spacer define a second temperature controlled passage for the meat emulsion to pass through the heat exchanger.

The first plate, the second plate, the first spacer and the second spacer are constructed and arranged to subject the meat emulsion to a first temperature as the meat emulsion passes through the first temperature controlled passage of the heat exchanger. The second plate, the third plate, the third spacer and the fourth spacer are constructed and arranged to subject the meat emulsion to a second temperature as the meat emulsion passes through the second temperature controlled passage of the heat exchanger.

Temperatures within the first and second temperature controlled passages of the heat exchanger can be controlled by passing a fluid through at least one passage of a portion of at least one of the first plate, the second plate and the third plate. For example, the first plate, the second plate and the third plate can define a plurality of individual temperature controlled zones. The temperatures of individual temperature controlled zones can be controlled by passing a fluid through a plurality of separate passages through individual portions of the first plate, the second plate and the third plate.

Figure 7:
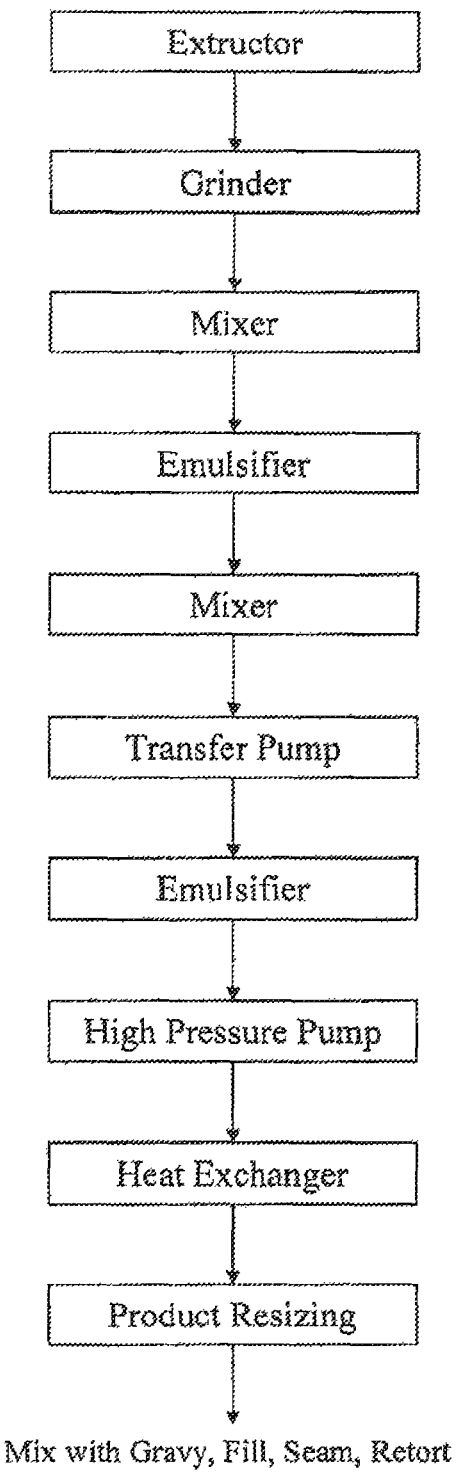
FIG. 7 is a schematic of a process for manufacturing meat emulsion products using the heat exchanger in an embodiment of the invention.

FIG. 7 sets forth a flow chart illustrating generally the process steps for making a meat emulsion product utilizing the heat exchanger in embodiments of the invention. In a general embodiment, the method comprises forming a meat emulsion containing protein and fat, comminuting and heating the meat emulsion, introducing the meat emulsion into a heat exchanger and subjecting the meat emulsion to a pressure of at least 50 psi. The heat exchanger comprises a first plate, a second plate attached to the first plate and separated by a first spacer and a second spacer arranged between the first plate and the second plate, and a third plate attached to the second plate and separated by a third spacer and a fourth spacer arranged between the second plate and the third plate. The first plate, the second plate, the first spacer and the second spacer define a first temperature controlled passage for the meat emulsion to pass through the heat exchanger. The second plate, the third plate, the third spacer and the fourth spacer define a second temperature controlled passage for the meat emulsion to pass through the heat exchanger. The heat emulsion is then discharged from the heat exchanger from the first and second temperature controlled passages.

The method can further comprise packaging and retorting the discharged meat emulsion product. In another embodiment, the method can further comprise drying or frying the discharged meat emulsion and forming a kibble-like piece from the meat emulsion.

The heat exchanger can be applied in the production of any product utilizing a heat exchanger. Generally, any viscous material such as plastics, confectionaries, doughs, polymers, sludges, and pastes can be processed using the methods and devices of the invention. Preferably, the heat exchanger can be applied to production of food products and/or meat emulsion products for pet and human consumption. The meat emulsion products can simulate any type of meat products including vegetable protein, poultry, beef, pork, and fish.

As set forth in detail below, generally the meat emulsion products can be produced by emulsifying meat, protein, water and various ingredients. The emulsion so produced is then run through a high speed emulsion mill, wherein the emulsion is rapidly heated to cause it to gel thermally. The heated emulsion is then discharged into a heat exchanger in an embodiment of the invention in which it solidifies into a striated meat-like structure.

As is set forth in detail below, a meat emulsion product can be produced that has improved fiber definition (visible, small diameter fibers) that affords the product a very realistic meat-like image. In this regard, the resultant meat emulsion product has fiber bundles or strands that afford the meat emulsion a very realistic muscle meat appearance. It is believed that for a resultant poultry meat emulsion product that the product of the invention has the appearance of tender slow cooked chicken or turkey that has been hand-pulled from the bone and covered in its own broth/juice. Pursuant to the invention, additionally, a meat emulsion product is produced that has irregular product shape and dimensions, and has a stronger bite/mouth feel than prior art products and is not pasty, mushy or brittle.

In preparing a meat emulsion product according to a method of the invention, a mixture of natural meat materials, including meat from mammals, fish, or fowl and/or meat by-products, having the requisite quality, ingredient cost and palatability, is formulated, ground, and emulsified. The meat and/or meat by-products used may be selected from a wide range of components, with the type and amount of meat material used in the formulation depending on a number of considerations, such as the intended use of the product, the desired flavor of the product, palatability, cost, availability of ingredients, and the like. Both meat (I.e., skeletal tissue and non-skeletal muscle) from a variety of mammals, fowl and fish and/or meat by-products (I.e., the non-rendered clean parts, other than meat, derived from slaughtered mammals, fowl, or fish) may be used as the meat material. Thus, the term meat material as used herein is understood to refer to non-dehydrated meat and/or meat by-products, including frozen materials.

If the product is intended for human consumption, any of the meats and meat byproducts used in the production of conventional meat emulsion products may be used in the invention, including meats such as whole-carcass beef and mutton, lean pork trim, beef shanks, veal, beef and pork cheek meat, and meat by-products such as lips, tripe, hearts, and tongues. If the product is intended for use as a pet food product, the meat mix may contain, in addition to the meat materials described above, any of the meat by-products which are approved for use in animal foods, such as mechanically deboned beef, chicken, or fish, beef and pork liver, lungs, kidney and the like. Typically the meat material is formulated to contain a maximum of about 15%, and preferably below about 10%, by weight of fat.

Additives which are used in conventional meat emulsion products may be mixed with the meat material and included in the meat emulsion of the invention. These additives include salt, spices, seasoning, sugar and the like in amounts sufficient to provide the product with desired taste characteristics. In addition, minor amounts of other dry ingredients such as, for example, functional ingredients, such as vitamins, antioxidants, prebiotics and minerals, flavors and the like, may also be added to the meat emulsion.

The meat emulsion may also include one or more dry proteinaceous materials, such as, for example, wheat gluten, soy flour, soy protein concentrate, soy protein isolate, egg albumin, and nonfat dry milk to improve emulsion stability and binding, impart flavor and reduce formulation costs. The inclusion of the dry proteinaceous materials in the meat emulsion is particularly advantageous in the production of product intended for use as a pet food. Dry proteinaceous material enables the processor to use meat materials having a protein to fat ratio and myosin to total protein ratio which would otherwise be of marginal acceptability for use in preparing meat emulsion products. If a dry, proteinaceous material is included in the meat emulsion, the amount used may vary from about 5% to about 35% by weight of the emulsion, depending on such factors as the intended use of the product, the quality of meat material used in the emulsion, ingredient cost considerations and the like. In a preferred embodiment, the level of dry proteinaceous material is between approximately 25 to about 35% by weight. Generally, as the fat content and/or moisture content of the meat material used are increased, the level of dry proteinaceous material in the emulsion is increased accordingly.

While the formulation of the meat emulsion may vary widely, the emulsion, including the dry proteinaceous material, should have a protein to fat ratio sufficient to form a firm meat emulsion product upon coagulation of the protein with no sign of emulsion instability. Further, the protein content of the emulsion must be such as will enable the emulsion, upon being heated to a temperature above the boiling point of water, to coagulate and form a firm emulsion product within a short period, that is, within about 5 minutes, and preferably within 3 minutes, after being heated to such a temperature. Thus, the meat materials and the additives, including the dry proteinaceous material (if used) are mixed together in proportions such that the meat material is present in an amount of from about 50% to 75% by weight, and preferably from about 60% to about 70% by weight of the meat emulsion. In a preferred embodiment, the starting ingredients for the meat emulsion comprise approximately 29 to about 31% by weight protein and approximately 4 to about 6% by weight fat. The resultant meat emulsion product should have a substantially similar profile to that of the starting ingredients. However, if gravy or broth is added to the product, this profile could change due to the moisture, protein and/or fat content of the gravy/broth.

In addition, the meat emulsion should be formulated to contain from about 45% to 80% by weight moisture, with the moisture content preferably being controlled from about 49% to 53% by weight of the meat emulsion, I.e., the meat materials and additives. The exact concentration of water in the emulsion will, of course, depend on the amount of protein and fat in the emulsion.

The meat mix selected for use is passed through a grinder to reduce the meat material into pieces of substantially uniform size. Generally it is preferred to pass the meat through a grinder equipped with a 1 cm or smaller grinding plate. While satisfactory results may be obtained by grinding the meat to a particle size larger than 1 cm, the use of such larger meat particles is generally not preferred. If the meat materials to be used are in a frozen condition, they must first be pre-broken or cut into pieces to reduce the size of the pieces going into the grinder. While the size of the pieces will depend on the size of the meat grinder intake, normally the frozen meat material is cut into pieces about 10 cm square.

After grinding, the mix of meat particles is conveyed to a mixing tank in which the meat is mixed until uniform. It preferably is heated to a temperature of from about 1° C. to about 7° C., such as by hot water jacketing, steam injection, and the like to facilitate pumping of the meat mix. The uniform mix of ground meat particles is then comminuted under conditions that cause the meat material to emulsify and form a meat emulsion, in which the protein and water of the meat mixture form a matrix that encapsulates the fat globules. The meat material may be emulsified by any conventional procedure and equipment commonly used in meat emulsification, such as by using a mixer, blender, grinder, silent cutter chopper, emulsion mill and the like, which is capable of breaking up and dispersing the fat as globules in the protein slurry to form an emulsion.

Typically the temperature of the meat emulsion increases during the emulsification process. This heating of the meat emulsion is not objectionable as long as the temperature does not increase to the point that protein denaturation begins to occur at an undesirable rate at this stage of the process. The temperature of the meat mixture during emulsification should be maintained below about 49° C. to minimize protein denaturing at this stage of the process. According to a preferred embodiment of the disclosure, the meat material is passed through an emulsion mill to emulsify the meat material with the emulsion being heated to a temperature from about 10° C. to about 49° C., preferably from about 21° C. to about 38° C.

The additives to be incorporated in the meat emulsion, including dry proteinaceous material (if used), may be added to the meat mix prior to emulsification. Alternatively, it is frequently preferable to incorporate the additives, particularly the dry proteinaceous material, in the meat mix after emulsification of the meat. Since the addition of the dry proteinaceous material increases the viscosity of the emulsion, better emulsification is obtained when the meat mix is emulsified before the addition of the dry proteinaceous material, which results in the formation of a viscous meat "dough."

This meat emulsion dough can be comminuted in turn, so as to increase the fineness of the emulsion and is rapidly heated to a temperature above the boiling point of water. At this temperature, the coagulation of protein in the emulsion proceeds so rapidly that the emulsion is set and a firm emulsion product formed within a very short period, e.g., 20 seconds or less.

It has been found that rapidly heating the viscous meat emulsion to a temperature above the boiling point of water—generally from about 120° C. to about 163° C., and preferably from about 140° C. to about 154° C.— will result in the protein in the emulsion coagulating to set the emulsion and form a firm emulsion product within about 5 minutes and typically from a few seconds to about 3 minutes after heating. At this stage in the process, the emulsion is under a pressure of approximately 100 to about 500 psi and preferably 200 to 350 psi. The high temperature, along with increased pressures will provide fiber definition to the product. It has been surprisingly found that the higher the product temperature and pressure the better the fiber development. By this is meant linear alignment with smaller, finer, long fibers.

Preferably, the emulsion is processed in equipment wherein the emulsion is heated to such elevated temperatures while it is being comminuted such as by mechanical heating and/or steam injection. According to a preferred embodiment, the viscous meat emulsion, which is at a temperature of from about 30° C. to about 40° C., is pumped through an emulsion mill in which the meat emulsion is subjected to shearing to increase the fineness of the emulsion and almost simultaneously heat the emulsion to from about 120° C. to about 163° C., preferably 140° C. to about 154° C., through rapid mechanical heating and/or steam injection. Thus, the emulsion preferably is heated to such elevated temperatures in a period of less than about 60 seconds.

When the emulsion has been heated to such an elevated temperature in this manner, further significant shearing and cutting of the emulsion should be avoided. Control of the emulsion temperature within the desired range can be effected by adjusting such factors as the feed rate into the emulsion mill, the rotational speed of the emulsion mill and the like, and can readily be determined by skilled artisans.

The hot meat emulsion, which is at a temperature above the boiling point of water and preferably in the range of from about 120° C. to about 163° C., preferably about 140° C. to about 154° C., is transferred with a positive displacement pump, e.g., a gear or lobe pump, to a heat exchanger in an embodiment of the invention. The product is pumped at high pressures of 80 psi to about 1500 psi, preferably about 150 psi to about 450 psi, and most preferably 200 psi to about 350 psi into the heat exchanger.

At such high pressures, the process operates at or close to the emulsifier upper design limit pressure. For this reason, preferably a positive displacement pump (pressure limit of 1500 to beyond 2500 psi.) is close-coupled directly after the emulsifier. This allows the use of the emulsifier to develop the high temperature without the high pressure. The pressure will be developed after the positive displacement pump. This thereby reduces the pressures in the emulsifier housing to 60 to 100 psi.

The emulsion is retained in the heat exchanger at a pressure above the vapor pressure of the emulsion until the protein in the meat emulsion has coagulated sufficiently to set the emulsion and form a firm emulsion product, which retains its shape and structure when discharged from the heat exchanger. At such elevated temperature, protein coagulation proceeds at a very rapid rate.

While the time required for the hot emulsion to set sufficiently to form a firm product will depend on a number of factors, such as the temperature to which the emulsion is heated and the amount and type of protein in the emulsion, a residence time of between a few seconds to about 3 minutes, and usually from about 1 to about 1.5 minutes, in the heat exchanger is generally sufficient for the protein to coagulate sufficiently and form a firm emulsion product which will retain its shape, integrity, and physical characteristics. The residence time in the heat exchanger can be controlled by adjusting the flow rate of the emulsion to the heat exchanger and/or by adjusting the length of the heat exchanger.

The structure and design of the heat exchanger in embodiments of the invention helps to create the fiber structure of the product. In addition, the flow rate and differing pressures on the product help create the fiber structure. Preferably the heat exchanger is cooled. This allows the product to be cooled as it is forced through the heat exchanger.

The heat exchanger in embodiments of the invention comprises preferred designs that facilitate efficient cooling or heating to the center of the product. The cooling increases process stability and, similar to a reduction in cross-sectional area, can enhance fiber definition and alignment by causing variations in the product viscosity and flow rate. The set meat emulsion pieces discharged from the heat exchanger are in the form of long strips of products having a temperature of about 65° C. to 100° C., and a moisture content of about 47% to 60%, with the pieces varying in size. Upon discharge from the heat exchanger, the pieces are rapidly cooled by evaporating cooling to a temperature in the range of 60° C. to 93° C. If desired, suitable cutting means, such as a rotary cut-off knife, a water jet knife, a knife grid, or the like may be mounted at the discharge end of the heat exchanger to cut the product into pieces of a desired size, e.g., from about 150 mm to about 350 mm. If desired, the product may be cut down the center to allow the product to cool more rapidly. The meat emulsion chunks thus formed have excellent integrity and strength and will retain their shape and fiber characteristics when subjected to commercial canning and retorting procedures such as those required in the production of canned foods having a high moisture content.

To enhance the fibrous image of the product, a set of compression rolls, which consists of two long lightly-textured cylinders (rolls) that spin at similar speeds, can be used prior to final product resizing or dicing. Product that is discharged from the heat exchanger is dropped into a narrow adjustable opening between the spinning cylinders, which open up, or partially separate or tear the fibers. It has been found that this incomplete form of shredding functions to emphasize the linear fibers.

The meat emulsion pieces discharged from the heat exchanger may be diced and conveyed to a dryer to remove a large portion of the moisture therefrom, and the dried product collected and stored. Moisture reduction may also be accomplished by exposing the pieces to dry heat, so that the resultant product pieces, although displaying fibers, have a generally kibble-like appearance. The dry heat may be provided by roasting, baking, grilling or frying the body. Preferably the body is flash fried. The duration would typically be less than one minute and preferably in the range from 15 to 35 seconds when the oil is in the temperature range from 150° C. to 200° C.

Alternatively, in producing a "wet" product, the meat emulsion pieces may be conveyed from the heat exchanger directly to a canning operation in which chunks are filled into cans together with other ingredients (e.g., sauce, gravy, and the like) and the cans retorted. In either situation, the product can be resized if desired.

By way of example, in the production of a canned pet food product, a suitable gravy may be prepared by heating a mixture of water, starch, and condiments. The meat emulsion chunks and gravy are filled into cans in the desired proportions. Then, the cans are vacuum sealed and are retorted under time-temperature conditions sufficient to effect commercial sterilization. Conventional retorting procedures may be used. Typically, a retorting temperature of about 118° C. to 121° C. for approximately 40 to 90 minutes is satisfactory in producing a commercially sterile product.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A device comprising:
a first plate;
a second plate attached to the first plate;
a first spacer and a second spacer arranged between the first plate and the second plate, wherein the first plate, the second plate, the first spacer and the second spacer define a first temperature controlled passage for a first product to pass through the device;
a third plate attached to the second plate, wherein at least one of the first plate, the second plate or the third plate is an energy exchanging plate comprising energy exchanging capabilities;
a third spacer and a fourth spacer arranged between the second plate and the third plate, wherein the second plate, the third plate, the third spacer and the fourth spacer define a second temperature controlled passage for a second product to pass through the device;
a first bracket comprising a first leg, a second leg, and a bridging portion extending from the first leg of the first bracket to the second leg of the first bracket;
a second bracket comprising a first leg, a second leg, and a bridging portion extending from the first leg of the second bracket to the second leg of the second bracket, wherein the first leg of the first bracket is connected to the first leg of the second bracket, and the second leg of the first bracket is connected to the second leg of the second bracket;
an end plate comprising first and second product inlets and connected to the bridging portion of the first bracket and the bridging portion of the second bracket;
a first temperature controlling passage in a first portion of the energy exchanging plate; and
a second temperature controlling passage that is separate from the first temperature controlling passage, the second temperature controlling passage is positioned in a second portion of the energy exchanging plate downstream from the first portion of the energy exchanging plate, and
the second temperature controlling passage is downstream from the first temperature controlling passage such that a distance from the end plate to the first temperature controlling passage along the first temperature controlled passage is less than a distance from the end plate to the second temperature controlling passage along the first temperature controlled passage;
wherein:
the first temperature controlling passage comprises a first fluid that cools or heats a first temperature controlled zone of the device,
the second temperature controlling passage comprises a second fluid that cools or heats a second temperature controlled zone of the device, and
the device is configured for control of at least one of a temperature or a flowrate of the first fluid separately from control of at least one of a temperature or a flowrate of the second fluid.

2. The device of claim 1 wherein:
the first plate is the energy exchanging plate,
at least one of the second plate or the third plate is an additional energy exchanging plate which comprises a third temperature controlling passage that is separate from the first and second temperature controlling passages,
the third temperature controlling passage is positioned in a first portion of the additional energy exchanging plate,
the additional energy exchanging plate further comprises a fourth temperature controlling passage that is separate from the first, second and third temperature controlling passages,
the fourth temperature controlling passage is positioned in a second portion of the additional energy exchanging plate downstream from the first portion of the additional energy exchanging plate, and
the fourth temperature controlling passage is downstream from the third temperature controlling passage such that a distance from the end plate to the third temperature controlling passage along the first temperature controlled passage is less than a distance from the end plate to the fourth temperature controlling passage along the first temperature controlled passage.

3. A device comprising:
a first plate;
a second plate attached to the first plate;
a first spacer and a second spacer arranged between the first plate and the second plate, wherein the first plate, the second plate, the first spacer and the second spacer define a first temperature controlled passage for a first product to pass through the device;
a third plate attached to the second plate, wherein at least one of the first plate, the second plate or the third plate is an energy exchanging plate comprising energy exchanging capabilities;
a third spacer and a fourth spacer arranged between the second plate and the third plate, wherein the second plate, the third plate, the third spacer and the fourth spacer define a second temperature controlled passage for a second product to pass through the device;
a first bracket comprising a first leg, a second leg, and a bridging portion extending from the first leg of the first bracket to the second leg of the first bracket;
a second bracket comprising a first leg, a second leg, and a bridging portion extending from the first leg of the second bracket to the second leg of the second bracket, wherein the first leg of the first bracket is connected to the first leg of the second bracket, and the second leg of the first bracket is connected to the second leg of the second bracket;
an end plate comprising first and second product inlets and connected to the bridging portion of the first bracket and the bridging portion of the second bracket;
a first temperature controlling passage in a first portion of the energy exchanging plate; and
a second temperature controlling passage that is separate from the first temperature controlling passage, the second temperature controlling passage is positioned in a second portion of the energy exchanging plate downstream from the first portion of the energy exchanging plate, and
the second temperature controlling passage is downstream from the first temperature controlling passage such that a distance from the end plate to the first temperature controlling passage along the first temperature controlled passage is less than a distance from the end plate to the second temperature controlling passage along the first temperature controlled passage;
wherein:
the first plate is the energy exchanging plate,
at least one of the second plate or the third plate is an additional energy exchanging plate which comprises a third temperature controlling passage that is separate from the first and second temperature controlling passages,
the third temperature controlling passage is positioned in a first portion of the additional energy exchanging plate,
the additional energy exchanging plate further comprises a fourth temperature controlling passage that is separate from the first, second and third temperature controlling passages,
the fourth temperature controlling passage is positioned in a second portion of the additional energy exchanging plate downstream from the first portion of the additional energy exchanging plate,
the fourth temperature controlling passage is downstream from the third temperature controlling passage such that a distance from the end plate to the third temperature controlling passage along the first temperature controlled passage is less than a distance from the end plate to the fourth temperature controlling passage along the first temperature controlled passage,
the third temperature controlling passage comprises a third fluid that cools or heats a third temperature controlled zone of the device,
the fourth temperature controlling passage comprises a fourth fluid that cools or heats a fourth temperature controlled zone of the device, and
the device is configured for control of at least one of a temperature or a flowrate of the third fluid separately from control of at least one of a temperature or a flowrate of the fourth fluid.

4. The device of claim 1 wherein:
the third plate is the energy exchanging plate,
at least one of the first plate or the second plate is an additional energy exchanging plate which comprises a third temperature controlling passage that is separate from the first and second temperature controlling passages,
the third temperature controlling passage is positioned in a first portion of the additional energy exchanging plate,
the additional energy exchanging plate further comprises a fourth temperature controlling passage that is separate from the first, second and third temperature controlling passages,
the fourth temperature controlling passage is positioned in a second portion of the additional energy exchanging plate downstream from the first portion of the additional energy exchanging plate, and
the fourth temperature controlling passage is downstream from the third temperature controlling passage such that a distance from the end plate to the third temperature controlling passage along the first temperature controlled passage is less than a distance from the end plate to the fourth temperature controlling passage along the first temperature controlled passage.

5. A device comprising:
a first plate;
a second plate attached to the first plate;
a first spacer and a second spacer arranged between the first plate and the second plate, wherein the first plate, the second plate, the first spacer and the second spacer define a first temperature controlled passage for a first product to pass through the device;
a third plate attached to the second plate, wherein at least one of the first plate, the second plate or the third plate is an energy exchanging plate comprising energy exchanging capabilities;
a third spacer and a fourth spacer arranged between the second plate and the third plate, wherein the second plate, the third plate, the third spacer and the fourth spacer define a second temperature controlled passage for a second product to pass through the device;
a first bracket comprising a first leg, a second leg, and a bridging portion extending from the first leg of the first bracket to the second leg of the first bracket;
a second bracket comprising a first leg, a second leg, and a bridging portion extending from the first leg of the second bracket to the second leg of the second bracket, wherein the first leg of the first bracket is connected to the first leg of the second bracket, and the second leg of the first bracket is connected to the second leg of the second bracket;
an end plate comprising first and second product inlets and connected to the bridging portion of the first bracket and the bridging portion of the second bracket;
a first temperature controlling passage in a first portion of the energy exchanging plate; and
a second temperature controlling passage that is separate from the first temperature controlling passage, the second temperature controlling passage is positioned in a second portion of the energy exchanging plate downstream from the first portion of the energy exchanging plate, and
the second temperature controlling passage is downstream from the first temperature controlling passage such that a distance from the end plate to the first temperature controlling passage along the first temperature controlled passage is less than a distance from the end plate to the second temperature controlling passage along the first temperature controlled passage;
wherein:
the third plate is the energy exchanging plate,
at least one of the first plate or the second plate is an additional energy exchanging plate which comprises a third temperature controlling passage that is separate from the first and second temperature controlling passages,
the third temperature controlling passage is positioned in a first portion of the additional energy exchanging plate,
the additional energy exchanging plate further comprises a fourth temperature controlling passage that is separate from the first, second and third temperature controlling passages,
the fourth temperature controlling passage is positioned in a second portion of the additional energy exchanging plate downstream from the first portion of the additional energy exchanging plate,
the fourth temperature controlling passage is downstream from the third temperature controlling passage such that a distance from the end plate to the third temperature controlling passage along the first temperature controlled passage is less than a distance from the end plate to the fourth temperature controlling passage along the first temperature controlled passage, the third temperature controlling passage comprises a third fluid that cools or heats a third temperature controlled zone of the device, the fourth temperature controlling passage comprises a fourth fluid that cools or heats a fourth temperature controlled zone of the device, and the device is configured for control of at least one of a temperature or a flowrate of the third fluid separately from control of at least one of a temperature or a flowrate of the fourth fluid.

6. The device of claim 1 wherein:

the second plate is the energy exchanging plate, at least one of the first plate or the third plate is an additional energy exchanging plate which comprises a third temperature controlling passage that is separate from the first and second temperature controlling passages, the third temperature controlling passage is positioned in a first portion of the additional energy exchanging plate, the additional energy exchanging plate further comprises a fourth temperature controlling passage that is separate from the first, second and third temperature controlling passages, the fourth temperature controlling passage is positioned in a second portion of the additional energy exchanging plate downstream from the first portion of the additional energy exchanging plate, and the fourth temperature controlling passage is downstream from the third temperature controlling passage such that a distance from the end plate to the third temperature controlling passage along the first temperature controlled passage is less than a distance from the end plate to the fourth temperature controlling passage along the first temperature controlled passage.

7. A device comprising:

a first plate;

a second plate attached to the first plate;

a first spacer and a second spacer arranged between the first plate and the second plate, wherein the first plate, the second plate, the first spacer and the second spacer define a first temperature controlled passage for a first product to pass through the device;

a third plate attached to the second plate, wherein at least one of the first plate, the second plate or the third plate is an energy exchanging plate comprising energy exchanging capabilities;

a third spacer and a fourth spacer arranged between the second plate and the third plate, wherein the second plate, the third plate, the third spacer and the fourth spacer define a second temperature controlled passage for a second product to pass through the device;

a first bracket comprising a first leg, a second leg, and a bridging portion extending from the first leg of the first bracket to the second leg of the first bracket;

a second bracket comprising a first leg, a second leg, and a bridging portion extending from the first leg of the second bracket to the second leg of the second bracket, wherein the first leg of the first bracket is connected to the first leg of the second bracket, and the second leg of the first bracket is connected to the second leg of the second bracket;

an end plate comprising first and second product inlets and connected to the bridging portion of the first bracket and the bridging portion of the second bracket;

a first temperature controlling passage in a first portion of the energy exchanging plate; and a second temperature controlling passage that is separate from the first temperature controlling passage, the second temperature controlling passage is positioned in a second portion of the energy exchanging plate downstream from the first portion of the energy exchanging plate, and the second temperature controlling passage is downstream from the first temperature controlling passage such that a distance from the end plate to the first temperature controlling passage along the first temperature controlled passage is less than a distance from the end plate to the second temperature controlling passage along the first temperature controlled passage;

wherein:

the second plate is the energy exchanging plate, at least one of the first plate or the third plate is an additional energy exchanging plate which comprises a third temperature controlling passage that is separate from the first and second temperature controlling passages, the third temperature controlling passage is positioned in a first portion of the additional energy exchanging plate, the additional energy exchanging plate further comprises a fourth temperature controlling passage that is separate from the first, second and third temperature controlling passages, the fourth temperature controlling passage is positioned in a second portion of the additional energy exchanging plate downstream from the first portion of the additional energy exchanging plate, the fourth temperature controlling passage is downstream from the third temperature controlling passage such that a distance from the end plate to the third temperature controlling passage along the first temperature controlled passage is less than a distance from the end plate to the fourth temperature controlling passage along the first temperature controlled passage, the third temperature controlling passage comprises a third fluid that cools or heats a third temperature controlled zone of the device, the fourth temperature controlling passage comprises a fourth fluid that cools or heats a fourth temperature controlled zone of the device, and the device is configured for control of at least one of a temperature or a flowrate of the third fluid separately from control of at least one of a temperature or a flowrate of the fourth fluid.

8. The device of claim 1 wherein the first plate and the second plate are sealed along the first spacer and the second spacer to withstand internal pressures in the first temperature controlled passage from 50 to 1500 psi.

9. The device of claim 1 wherein the second plate and the third plate are sealed along the third spacer and the fourth spacer to withstand internal pressures in the second temperature controlled passage from 50 to 1500 psi.

10. The device of claim 1 wherein the first plate, the second plate and the third plate are attached together by at least one of a bolt, a screw or a clamp.

11. The device of claim 1 comprising an inlet manifold attached to an end of the device, the inlet manifold defining an inlet passage that divides into a first outlet passage and a second outlet passage, the first outlet passage leading into the first temperature controlled passage of the device and the second outlet passage leading into the second temperature controlled passage of the device.

12. A method for making a food product, the method comprising:
introducing a meat emulsion into the device of claim 1; and
subjecting the meat emulsion to a pressure of 100 psi to 500 psi in the device.

13. A heat exchanger comprising:
a first plate;
a second plate attached to the first plate;
a first spacer and a second spacer arranged between the first plate and the second plate, wherein the first plate, the second plate, the first spacer and the second spacer define a first passage for a first product to pass through the heat exchanger;
a third plate attached to the second plate, at least one of the first plate, the second plate or the third plate comprising energy exchanging capabilities; and
a third spacer and a fourth spacer arranged between the second plate and the third plate, wherein the second plate, the third plate, the third spacer and the fourth spacer define a second passage for a second product to pass through the heat exchanger,
a first bracket comprising a first leg, a second leg, and a bridging portion extending from the first leg of the first bracket to the second leg of the first bracket;
a second bracket comprising a first leg, a second leg, and a bridging portion extending from the first leg of the second bracket to the second leg of the second bracket, wherein the first leg of the first bracket is connected to the first leg of the second bracket, and the second leg of the first bracket is connected to the second leg of the second bracket;
an end plate comprising first and second product inlets and connected to the bridging portion of the first bracket and the bridging portion of the second bracket;
a first temperature controlling passage in a first portion of the energy exchanging plate; and
a second temperature controlling passage that is separate from the first temperature controlling passage, the second temperature controlling passage is positioned in a second portion of the energy exchanging plate downstream from the first portion of the energy exchanging plate, and
the second temperature controlling passage is downstream from the first temperature controlling passage such that a distance from the end plate to the first temperature controlling passage along the first temperature controlled passage is less than a distance from the end plate to the second temperature controlling passage along the first temperature controlled passage;
wherein:
the first temperature controlling passage comprises a first fluid that cools or heats a first temperature controlled zone of the heat exchanger,
the second temperature controlling passage comprises a second fluid that cools or heats a second temperature controlled zone of the heat exchanger, and
the heat exchanger is configured for control of at least one of a temperature or a flowrate of the first fluid separately from control of at least one of a temperature or a flowrate of the second fluid.

14. A method for making a food product, the method comprising:
introducing a meat emulsion into the heat exchanger of claim 13; and
subjecting the meat emulsion to a pressure of 100 psi to 500 psi in the heat exchanger.

15. The heat exchanger of claim 13 wherein:
the first plate is the energy exchanging plate,
at least one of the second plate or the third plate is an additional energy exchanging plate which comprises a third temperature controlling passage that is separate from the first and second temperature controlling passages,
the third temperature controlling passage is positioned in a first portion of the additional energy exchanging plate,
the additional energy exchanging plate further comprises a fourth temperature controlling passage that is separate from the first, second and third temperature controlling passages,
the fourth temperature controlling passage is positioned in a second portion of the additional energy exchanging plate downstream from the first portion of the additional energy exchanging plate, and
the fourth temperature controlling passage is downstream from the third temperature controlling passage such that a distance from the end plate to the third temperature controlling passage along the first temperature controlled passage is less than a distance from the end plate to the fourth temperature controlling passage along the first temperature controlled passage.

16. The heat exchanger of claim 13 wherein:
the second plate is the energy exchanging plate,
at least one of the first plate or the third plate is an additional energy exchanging plate which comprises a third temperature controlling passage that is separate from the first and second temperature controlling passages,
the third temperature controlling passage is positioned in a first portion of the additional energy exchanging plate,
the additional energy exchanging plate further comprises a fourth temperature controlling passage that is separate from the first, second and third temperature controlling passages,
the fourth temperature controlling passage is positioned in a second portion of the additional energy exchanging plate downstream from the first portion of the additional energy exchanging plate, and
the fourth temperature controlling passage is downstream from the third temperature controlling passage such that a distance from the end plate to the third temperature controlling passage along the first temperature controlled passage is less than a distance from the end plate to the fourth temperature controlling passage along the first temperature controlled passage.

17. The heat exchanger of claim 13 wherein:
the third plate is the energy exchanging plate,
at least one of the first plate or the second plate is an additional energy exchanging plate which comprises a third temperature controlling passage that is separate from the first and second temperature controlling passages,
the third temperature controlling passage is positioned in a first portion of the additional energy exchanging plate,
the additional energy exchanging plate further comprises a fourth temperature controlling passage that is separate from the first, second and third temperature controlling passages, the fourth temperature controlling passage is positioned in a second portion of the additional energy exchanging plate downstream from the first portion of the additional energy exchanging plate, and the fourth temperature controlling passage is downstream from the third temperature controlling passage such that a distance from the end plate to the third temperature controlling passage along the first temperature controlled passage is less than a distance from the end plate to the fourth temperature controlling passage along the first temperature controlled passage.

\* \* \* \* \*